United States Patent
Mayrench et al.

(10) Patent No.: US 8,750,440 B1
(45) Date of Patent: Jun. 10, 2014

(54) NOISE ESTIMATION IN COMMUNICATION RECEIVERS

(71) Applicant: Marvell International Ltd., Hamilton (BM)

(72) Inventors: Ronen Mayrench, Ra'anana (IL); Daniel Yellin, Ra'anana (IL); Yona Perets, Ra'anana (IL)

(73) Assignee: Marvell International Ltd, Hamilton (BM)

( * ) Notice: Subject to any disclaimer, the term of this patent is extended or adjusted under 35 U.S.C. 154(b) by 0 days.

(21) Appl. No.: 13/953,756

(22) Filed: Jul. 30, 2013

Related U.S. Application Data

(63) Continuation of application No. 12/831,282, filed on Jul. 7, 2010, now Pat. No. 8,526,552.

(60) Provisional application No. 61/236,823, filed on Aug. 25, 2009.

(51) Int. Cl.
*H04B 7/10* (2006.01)
*H04L 25/08* (2006.01)

(52) U.S. Cl.
USPC .......................................... 375/347; 375/346

(58) Field of Classification Search
None
See application file for complete search history.

(56) References Cited

U.S. PATENT DOCUMENTS

| | | | | |
|---|---|---|---|---|
| 5,548,819 A * | 8/1996 | Robb | ............................. | 455/59 |
| 6,904,110 B2 * | 6/2005 | Trans et al. | .................. | 375/350 |
| 7,103,316 B1 * | 9/2006 | Hall | ............................. | 455/63.1 |
| 7,379,851 B2 * | 5/2008 | Koizumi et al. | .............. | 702/189 |
| 7,466,969 B2 | 12/2008 | Kimata et al. | | |
| 7,561,627 B2 * | 7/2009 | Chow et al. | .................... | 375/260 |
| 7,649,964 B2 | 1/2010 | Matsumoto | | |
| 7,702,042 B2 * | 4/2010 | Desperben et al. | ........... | 375/340 |
| 7,848,469 B2 * | 12/2010 | Majonen | ....................... | 375/346 |
| 7,929,592 B1 * | 4/2011 | Okumura et al. | ............. | 375/148 |
| RE42,317 E * | 5/2011 | Al-Dhahir et al. | ............ | 348/614 |
| 7,965,619 B2 | 6/2011 | Taira et al. | | |
| 8,483,641 B1 | 7/2013 | Mayrench et al. | | |
| 8,526,552 B1 | 9/2013 | Mayrench et al. | | |
| 2004/0076185 A1 | 4/2004 | Kim et al. | | |
| 2005/0107039 A1 * | 5/2005 | Lindoff et al. | ............... | 455/63.1 |
| 2005/0243791 A1 * | 11/2005 | Park et al. | ...................... | 370/343 |
| 2005/0281324 A1 * | 12/2005 | Wallen | .......................... | 375/148 |
| 2006/0007990 A1 | 1/2006 | Cozzo et al. | | |
| 2006/0034398 A1 * | 2/2006 | Reznik et al. | ................. | 375/340 |
| 2006/0251156 A1 * | 11/2006 | Grant et al. | ................... | 375/148 |
| 2007/0053417 A1 * | 3/2007 | Nagata et al. | ................ | 375/147 |
| 2007/0058735 A1 * | 3/2007 | Ghosh | .......................... | 375/260 |
| 2007/0071145 A1 * | 3/2007 | Perets | ........................... | 375/346 |

(Continued)

OTHER PUBLICATIONS

U.S. Appl. No. 12/831,282 Office Action dated Feb. 14, 2013.

(Continued)

*Primary Examiner* — Chieh M Fan
*Assistant Examiner* — Bahman Badipour

(57) ABSTRACT

A method includes receiving at a receiver a signal including reference symbols that is sent over a communication channel from a transmitter to the receiver. A response of the communication channel is estimated by applying one or more weighting values to the reference symbols. A noise correction factor is computed based on the weighting values. An estimate of a noise level in the received signal is computed based on the estimated response of the communication channel and the noise correction factor. The received signal is decoded based on the estimate of the noise level.

20 Claims, 2 Drawing Sheets

(56) References Cited

U.S. PATENT DOCUMENTS

| | | | |
|---|---|---|---|
| 2007/0142009 A1* | 6/2007 | Scarpa et al. | 455/132 |
| 2007/0183537 A1* | 8/2007 | Matsumoto | 375/340 |
| 2007/0287382 A1* | 12/2007 | Catreux-Erceg et al. | 455/63.1 |
| 2008/0008258 A1 | 1/2008 | Tanabe | |
| 2008/0051095 A1 | 2/2008 | Chang et al. | |
| 2008/0153428 A1* | 6/2008 | Han et al. | 455/69 |
| 2008/0165901 A1* | 7/2008 | Krupka | 375/340 |
| 2008/0225934 A1* | 9/2008 | Mourad et al. | 375/227 |
| 2008/0285674 A1* | 11/2008 | Tseng et al. | 375/267 |
| 2009/0022217 A1* | 1/2009 | Kimata | 375/232 |
| 2009/0046582 A1* | 2/2009 | Sarkar et al. | 370/230.1 |
| 2009/0075686 A1* | 3/2009 | Gomadam et al. | 455/500 |
| 2009/0122900 A1 | 5/2009 | Mege et al. | |
| 2009/0291642 A1* | 11/2009 | Cozzo et al. | 455/67.13 |
| 2009/0296863 A1* | 12/2009 | Tirkkonen et al. | 375/346 |
| 2010/0067620 A1* | 3/2010 | Reznik et al. | 375/340 |
| 2010/0111223 A1* | 5/2010 | Thomas et al. | 375/296 |
| 2010/0124893 A1* | 5/2010 | Clevorn et al. | 455/226.3 |
| 2010/0197262 A1* | 8/2010 | Hosokawa et al. | 455/234.1 |
| 2011/0026566 A1* | 2/2011 | Grant | 375/144 |
| 2011/0096853 A1* | 4/2011 | Jayaraman et al. | 375/260 |
| 2011/0142102 A1* | 6/2011 | Okumura et al. | 375/148 |
| 2011/0222638 A1 | 9/2011 | Park et al. | |
| 2011/0249588 A1* | 10/2011 | Petersson et al. | 370/252 |
| 2011/0249779 A1 | 10/2011 | Miao et al. | |
| 2011/0305268 A1* | 12/2011 | Lindoff et al. | 375/227 |
| 2012/0027115 A1* | 2/2012 | Grant et al. | 375/267 |
| 2012/0195397 A1* | 8/2012 | Sayana et al. | 375/340 |
| 2012/0219050 A1* | 8/2012 | Zhang | 375/227 |

OTHER PUBLICATIONS

Dangl et al., "An Improved Block Equalization Scheme for Uncertain Channel Estimation", IEEE Transactions on Wireless Communications, vol. 6, No. 1, pp. 146-156, Jan. 2007.

U.S. Appl. No. 13/195,505 Office Action dated Jan. 24, 2013.

3GPP TR 36.814 V0.4.1, "3rd Generation Partnership Project; Technical Specification Group Radio Access Network; Evolved Universal Terrestrial Radio Access (E-UTRA); Further advancements for E-UTRA physical layer aspects (Release 9)", Feb. 2009.

3GPP TS 36.211 V8.6.0, "3rd Generation Partnership Project; Technical Specification Group Radio Access Network; Evolved Universal Terrestrial Radio Access (E-UTRA); Physical Channels and Modulation (Release 8)", Mar. 2009.

3GPP TS 36.213 V8.6.0, "3rd Generation Partnership Project; Technical Specification Group Radio Access Network; Evolved Universal Terrestrial Radio Access (E-UTRA); Physical layer procedures (Release 8)", Mar. 2009.

U.S. Appl. No. 12/831,282 Office Action dated Oct. 3, 2010.

* cited by examiner

NOISE ESTIMATION IN COMMUNICATION RECEIVERS

CROSS-REFERENCE TO RELATED APPLICATIONS

This application is a continuation of U.S. patent application Ser. No. 12/831,282, filed Jul. 7, 2010, now U.S. Pat. No. 8,526,552, which claims the benefit of U.S. Provisional Patent Application 61/236,823, filed Aug. 25, 2009. The disclosures of these related applications are incorporated herein by reference.

FIELD OF THE DISCLOSURE

The present disclosure relates generally to communication systems, and particularly to methods and systems for noise estimation in communication receivers.

BACKGROUND

Communication receivers commonly estimate the response of the communication channel over which they receive signals, as well as the noise level in the received signals. Channel and noise estimation are used, for example, for decoding the received signals and for assessing the channel quality.

SUMMARY

An embodiment that is described herein provides a method, which includes receiving at a receiver a signal including reference symbols that is sent over a communication channel from a transmitter to the receiver. A response of the communication channel is estimated by applying one or more weighting values to the reference symbols. A noise correction factor is computed based on the weighting values. An estimate of a noise level in the received signal is computed based on the estimated response of the communication channel and the noise correction factor. The received signal is decoded based on the estimate of the noise level.

In some embodiments, the method includes calculating channel quality feedback for the communication channel based on the estimated response of the communication channel and the estimate of the noise level. In an embodiment, receiving the signal includes receiving two or more versions of the signal via two or more antennas, respectively, computing the estimate of the noise level includes calculating multiple noise covariances based on the versions of the signal, and computing the noise correction factor includes calculating multiple noise correction factors to be applied respectively to the noise covariances.

In a disclosed embodiment, applying the weighting values includes selecting the weighting values from among multiple sets of the weighting values. In an embodiment, computing the estimate of the noise level includes applying a single noise correction factor for at least two of the sets of the weighting values. In another embodiment, the method includes choosing one or more of the weighting values so as to improve the estimate of the noise level. In yet another embodiment, choosing the weighting values includes defining a maximum value for the noise correction factor, and adjusting the weighting values such that the noise correction factor does not exceed the maximum value.

In still another embodiment, computing the noise correction factor includes selecting the noise correction factor from a list of predefined noise correction factors by applying a selection criterion to the weighting values. In an embodiment, receiving the signal includes receiving a Long Term Evolution (LTE) signal.

There is additionally provided, in accordance with an embodiment that is described herein, apparatus including a receiver front-end, a channel estimation unit, a correction unit and a noise estimation unit. The receiver front-end is configured to receive a signal including reference symbols that is sent from a transmitter to the receiver over a communication channel. The channel estimation unit is configured to estimate a response of the communication channel by applying one or more weighting values to the reference symbols. The correction unit is configured to compute a noise correction factor based on the weighting values. The noise estimation unit is configured to compute an estimate of a noise level in the received signal based on the estimated response of the communication channel and the noise correction factor. In an embodiment, a mobile communication terminal includes the disclosed communication apparatus. In another embodiment, a chipset for processing signals in a mobile communication terminal includes the disclosed communication apparatus.

The present disclosure will be more fully understood from the following detailed description of the embodiments thereof, taken together with the drawings in which:

DETAILED DESCRIPTION OF EMBODIMENTS

Embodiments that are described herein provide improved methods and devices for estimating noise in communication receivers. In some embodiments, a mobile communication terminal receives a downlink signal over a communication channel. The received signal comprises data-carrying symbols and reference symbols. The terminal estimates the response of the communication channel and the noise level in the signal based on the received reference signals. The noise and channel response estimates are used for decoding the data-carrying symbols and for assessing the channel quality.

In many practical scenarios, however, estimating both the noise and the channel response using the same reference symbols distorts the noise estimate. In some embodiments, the terminal corrects this distortion by calculating a noise correction factor and applying this factor to the noise estimate.

In an example embodiment, the channel response is estimated by assigning respective weights to the received reference symbols, and calculating the estimated channel response based on the weighted reference symbols. Assigning different weights to different reference symbols enables the terminal to achieve accurate channel estimation for various communication channels and various channel conditions, e.g., delay spread, Signal-to-Noise Ratio (SNR) and speed of the communication terminal. The channel estimation weights may depend on the time-frequency location of the reference symbols, the rate at which the channel varies over time, the SNR conditions and/or the channel time profile, for example. In this embodiment, the terminal calculates the noise correction factor as a function of the weights used for channel estimation. Thus, the corrected noise estimate is calculated based on the received reference symbols, the estimated channel response and the noise correction factor. In one example embodiment, the noise correction factors can be different per frequency location as the channel estimation weights can change over frequency. In another example embodiment, the noise correction factors can be similar over frequency.

The techniques described herein improve the accuracy of the noise estimate, even though the estimate is based on the same reference symbols that are used for channel estimation. As a result, communication receivers that use these techniques are able to decode the data carried by the received signals with low error probability, and to assess the channel quality (e.g., for computing channel quality feedback) with high accuracy.

Figure 1:
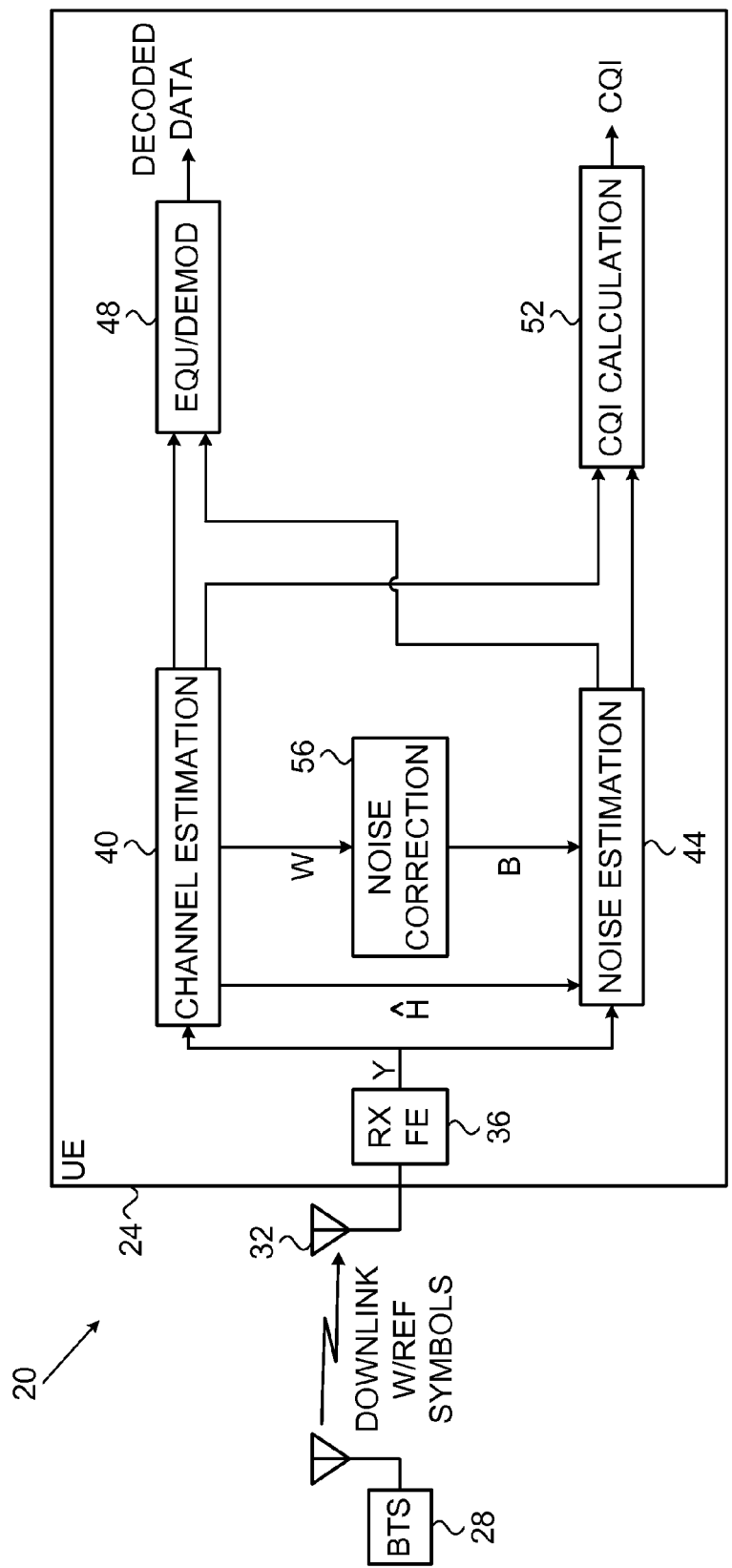
FIG. 1 is a block diagram that schematically illustrates a communication system, in accordance with an embodiment that is described herein.

FIG. 1 is a block diagram that schematically illustrates a communication system 20, in accordance with an embodiment that is described herein. System 20 comprises a mobile communication terminal 24, also referred to as User Equipment (UE). UE 24 receives downlink signals from a Base Transceiver Station (BTS) 28 over a wireless communication channel. UE 24 may comprise, for example, a cellular phone, a communication-enabled mobile computing device, a cellular adapter for a mobile computing device, or any other suitable communication terminal.

In the present example, system 20 comprises an Evolved Universal Terrestrial Radio Access (E-UTRA) system, also referred to as Long-Term Evolution (LTE). In this embodiment, the downlink signals received by UE 24 comprise Orthogonal Frequency Division Multiplexing (OFDM) signals. In alternative embodiments, system 20 may conform to any other suitable communication standard or protocol, such as Wideband Code-Division Multiple Access (WCDMA), WiMAX and LTE-Advanced (LTE-A). The downlink signals that are transmitted from BTS 28 to UE 24 comprise data-carrying symbols and reference symbols. The reference symbols are symbols whose values and time-frequency locations are known to UE 24 a-priori, and are typically used by the UE for various estimation processes.

In UE 24, a receiver front-end (RX FE) 36 receives the downlink signals via an antenna 32. RX FE 36 typically down-converts, filters and digitizes the received signals, so as to produce a digital baseband signal. The baseband signal output by the RX FE comprises both data-carrying symbols and reference symbols. The reference symbols are denoted Y.

UE 24 comprises a channel estimation unit 40 and a noise estimation unit 44, both operating on the received reference symbols. Channel estimation unit 40 estimates the response of the wireless communication channel between BTS 28 and UE 24 based on the received reference symbols. The estimated channel response is denoted $\hat{H}$. The term "channel response" refers to the gain and transfer phase of the channel between the transmitted signal generated at the BTS and the received signal at the UE. The gain and phase are sometimes expressed as a complex value. In some embodiments, the BTS and/or UE comprise multiple antennas. In these embodiments, unit 44 typically estimates the channel response for each pair of transmit antenna and receive antenna.

In an embodiment, the channel estimation unit applies certain weights (also referred to as weighting values) to the received reference symbols, and then estimates the channel response based on the weighted reference symbols. The weights are denoted W. In an example embodiment, unit 40 estimates the channel response using the weights and the received reference symbols by calculating a weighted average of the reference symbols in which each reference symbol is multiplied by the respective weight. The channel estimation unit may use different approaches to estimate the channel response, e.g., one-dimensional (1-D) time-domain and 1-D frequency-domain calculations, or two-dimensional (2-D) calculations. In both cases the channel estimation weights that are used to correct the noise estimation can be viewed as equivalent 2-D weights.

Noise estimation unit 44 uses the received reference symbols to estimate the noise level in the received downlink signals. In context of the present patent application and in the claims, the term "noise level" refers to the level of any undesired component of the received signal, e.g., thermal noise, interference from undesired transmissions, noise that is added to the received signal due to various receiver imperfections (e.g., channel estimation that differs from the actual channel value and may add noise to the decoded signal), and/or any other undesired component. In an example embodiment, unit 44 estimates the noise variance of the received signal at each receive antenna. In some embodiments, the noise estimation is frequency-dependent.

The outputs of units 40 and 44 are used for decoding the data-carrying symbols of the downlink signals, as well as for assessing the channel quality. In an embodiment, UE 24 comprises an equalizer/demodulator 48, which demodulates the data-carrying symbols based on the estimated channel response and the estimated noise level, so as to decode the data transmitted from BTS 28 to UE 24. UE 24 further comprises a Channel Quality Indication (CQI) calculation unit 52, which calculates the CQI of the communication channel based on the estimated channel response and the estimated noise level. In some embodiments, the CQI is fed back to BTS 28.

As noted above, both channel estimation and noise estimation are performed by operating on the received reference symbols Y. In the present example, the OFDM downlink signals, including the reference symbols, are received in certain time-frequency allocations that are referred to as Resource Elements (REs). In practice, deriving both channel and noise estimates from the same reference symbols may distort the noise estimation.

Consider, for example, the downlink signal that is received in a certain RE. The received signal can be written as $$Y = S \cdot H + N \qquad \text{Equation 1}$$

wherein Y denotes the received signal, S denotes the signal transmitted by the BTS, H denotes the channel response, and N denotes the noise term. Assume that unit 44 were to estimate the noise based on the received reference symbols Y and the estimated channel response $\hat{g}$:

$$\hat{N} = Y - \hat{H} \cdot S. \qquad \text{Equation 2}$$

In some practical cases, this sort of noise estimation deviates from the true noise level, because the channel estimate and the noise estimate are derived from the same reference symbols in the same REs. Errors in the noise estimation are especially likely when the noise estimate is expected to measure the sum of the noise variance and the channel estimation errors, as is often the case in practice.

Consider, for example, two reference symbols m=1 and m=2, which are received in two different REs. In the present example, the channel is constant, i.e., H(m)=1, and the transmitted reference symbols are also constant, i.e., S(m)=1. According to Equation 1 above, the received signal is given by Y(1)=1+N(1) and Y(2)=1+N(2).

In the present example, channel estimation unit 40 estimates the channel response using the following weighted average:

$$\hat{H}(1) = \frac{3}{4} \cdot Y(1) + \frac{1}{4} \cdot Y(2). \quad \text{Equation 3}$$

The noise estimate in this case (using Equation 2 above) is:

$$\hat{N}(1) = Y(1) - \left(\frac{3}{4} \cdot Y(1) + \frac{1}{4} \cdot Y(2)\right) = \frac{1}{4} \cdot N(1) - \frac{1}{4} \cdot N(2). \quad \text{Equation 4}$$

Assume that there is no correlation between N(1) and N(2), and that both noise terms have the same variance. Thus, the estimated noise variance would be the empirical variance of $\hat{N}(1)$ that converges asymptotically to $$\hat{\sigma}_N^2(1) = \frac{2}{16}\sigma_N^2. \quad \text{Equation 5}$$

If, however, the channel estimation errors and the noise term are actually uncorrelated, then the true value of the noise variance should be:

$$\hat{\sigma}_N^2(1) = \sigma_N^2 + E\{|H - \hat{H}|^2\} \quad \text{Equation 6}$$
$$= \sigma_N^2\left(1 + \frac{10}{16}\right) = \frac{26}{16}\sigma_N^2.$$

By comparing Equations 5 and 6, it can be seen that there is a considerable deviation (a factor of thirteen) between the estimated noise variance (Equation 5) and the true noise variance (Equation 6). In an OFDM system, such a deviation may occur since the noise is estimated using the same pilot bins that are also used for channel estimation. Thus, the noise estimation may be degraded due to presence of the actual noise term both in the channel estimation and in the noise estimation.

In some embodiments, UE 24 comprises a noise correction unit 56, which calculates a noise correction factor that compensates for the above-described errors in the noise estimate of unit 44. The noise correction factor is denoted B. Noise correction unit 56 accepts the weights W that are applied to the reference symbols by channel estimation unit 40, and calculates the correction factor B based on the weights W.

Noise estimation unit 44 then corrects its noise estimate using the correction factor B, so as to produce a corrected noise estimate. In other words, noise estimation unit 44 calculates the noise estimate based on (1) the received pilot symbols Y, (2) the estimated channel response $\hat{H}$, and (3) the noise correction factor B. The corrected noise estimate is then used by equalizer/demodulator 48 for decoding the data, and by CQI calculation unit 52 for assessing the channel quality feedback.

The UE configuration shown in FIG. 1 is a simplified example configuration, which is depicted solely for the sake of conceptual clarity. In alternative embodiments, any other suitable UE configuration can be used. UE elements that are not necessary for understanding the disclosed techniques have been omitted from the figure for the sake of clarity. For example, the UE typically comprises transmission elements (not shown in the figure) for transmitting uplink signals toward the BTS. Although FIG. 1 shows a single UE and a single BTS for the sake of clarity, real-life systems typically comprise multiple UEs and multiple BTSs.

The different elements of UE 24, including units 40, 44, 48, 52 and 56, may be implemented using dedicated hardware logic, such as using one or more Application-Specific Integrated Circuits (ASICs) and/or Field-Programmable Gate Arrays (FPGAs). UE elements can be combined with one another in one or more IC devices, or partitioned among different IC devices in any suitable manner. Alternatively, some UE elements may be implemented using software running on general-purpose hardware, or using a combination of hardware and software elements. In some embodiments, certain elements of UE 24 are implemented using a general-purpose processor, which is programmed in software to carry out the functions described herein, although it too may be implemented on dedicated hardware. The software may be downloaded to the processor in electronic form, over a network, for example, or it may, alternatively or additionally, be provided and/or stored on non-transitory tangible media, such as magnetic, optical or electronic memory. In some embodiments, some or all of the elements of UE 24 may be fabricated in a chip-set.

The following description demonstrates the process of calculating the noise correction factor and using it to correct the noise estimate. In the present example, the UE receives the downlink signals via multiple receive antennas, and the noise estimate and noise correction factors are calculated for each noise covariance element. For example:

$$R_{NN}(i,j) = E\{N_i \cdot N_j^*\} \quad \text{Equation 7}$$

wherein $R_{NN}(i,j)$ denotes the noise covariance term between the $i^{th}$ and $j^{th}$ receive antennas. Typically, the noise estimation unit estimates the noise by calculating noise covariance between pairs of antennas, and the noise correction unit calculates the noise correction factor per noise covariance element. In an example embodiment, the noise correction factors are calculated from the channel estimation weighting factors.

In this embodiment, unit 40 estimates the channel response by calculating a linear weighted average of the received reference symbols. In an example embodiment, the weights are assigned using a MMSE criterion. The channel response estimate can be written as:

$$\hat{H}(m) = \sum_k w(k) \cdot Y(k), \quad \text{Equation 8}$$

wherein $\hat{H}(m)$ denotes the channel response estimate for the $m^{th}$ RE, based on two or more reference symbols. The estimated noise (before correction) can be written as:

$$\hat{N}(m) = Y(m) - \sum_k w(k) \cdot (H(k) + N(k)) \quad \text{Equation 9}$$
$$= H(m) - \sum_k w(k) \cdot H(k) + N(m) - \sum_k w(k) \cdot N(k)$$

$$\hat{N}(m) = \Delta H(m) + N(m) - \sum_k w(k) \cdot N(k) \quad \text{Equation 10}$$
$$= \Delta H(m) + N(m) \cdot (1 - w(m)) - \sum_{k \neq m} w(k) \cdot N(k)$$

The output of noise estimate can thus be written as $$R_{\hat{N}\hat{N}}(i,j) = E\{\hat{N}_i \cdot \hat{N}_j^*\} = E\{\Delta H_i \cdot \Delta H_j^*\} + \qquad \text{Equation 11}$$
$$E\{N_i \cdot N_j^*\} \cdot (1 - w_i - w_j^* + w_i \cdot w_j^*) +$$
$$E\{N_i \cdot N_j^*\} \cdot \sum_{k \neq i} w_i(k) \cdot w_j^*(k)$$

$$R_{\hat{N}\hat{N}}(i,j) = E\{\hat{N}_i \cdot \hat{N}_j^*\} = E\{\Delta H_i \cdot \Delta H_j^*\} + \qquad \text{Equation 12}$$
$$R_{NN}(i,j) \cdot \left[ 1 - w_i - w_j^* + \sum_k w_i(k) \cdot w_j^*(k) \right]$$

wherein i and j denote indices of the receive antennas and the expectation operator E{ } is applied over a certain frequency range and over time. For example, i=0 and j=0 refers to noise variance of the first antenna.

The desired noise, assuming channel estimation errors and ignoring high order noise terms, is given by:

$$R_{NN}^{des}(i,j) \triangleq R_{NN}(i,j) + E\{(H_i - \hat{H}_i) \cdot (H_j - \hat{H}_j)^*\} \qquad \text{Equation 13}$$

$$R_{NN}^{des}(i,j) \triangleq E\{\Delta H_i \cdot \Delta H_j^*\} + R_{NN}(i,j) \cdot \left[1 + \sum_k w_i(k) \cdot w_j^*(k)\right] \qquad \text{Equation 14}$$

Assuming the channel estimation error is small relative to the noise terms, the noise correction factor is given by:

$$B(i,j) = \frac{\left(1 + \sum_k w_i(k) \cdot w_j^*(k)\right)}{\left(1 - w_i - w_j^* + \sum_k w_i(k) \cdot w_j^*(k)\right)} \qquad \text{Equation 15}$$

According to the previous example, the channel estimation weights are {¾, ¼} and the noise correction factor will be:

$$B = \frac{\left(1 + \left(\frac{1}{4}\right)^2 + \left(\frac{3}{4}\right)^2\right)}{\left(1 - 2 \cdot \frac{3}{4} + \left(\frac{1}{4}\right)^2 + \left(\frac{3}{4}\right)^2\right)} = \frac{\frac{26}{16}}{\frac{26}{16} - \frac{24}{16}} = 13 \qquad \text{Equation 16}$$

which is the desired correction factor for correcting the noise estimation error.

In an embodiment, the bias correction factor can be similar for all frequencies, and differ for different elements in the $R_{NN}$ matrix. In another embodiment, the bias correction factor can be different for each element of the $R_{NN}$ matrix and for each frequency range.

In an embodiment, noise estimation unit 44 calculates a noise estimate by processing the received reference symbols, noise correction unit 56 calculates the noise correction factor of Equation 14, and then noise estimation unit 44 multiplies the noise estimate by the noise correction factor, to produce a corrected noise estimate. In an embodiment, the correction factor is different for each element in the $R_{NN}$ matrix.

Figure 2:
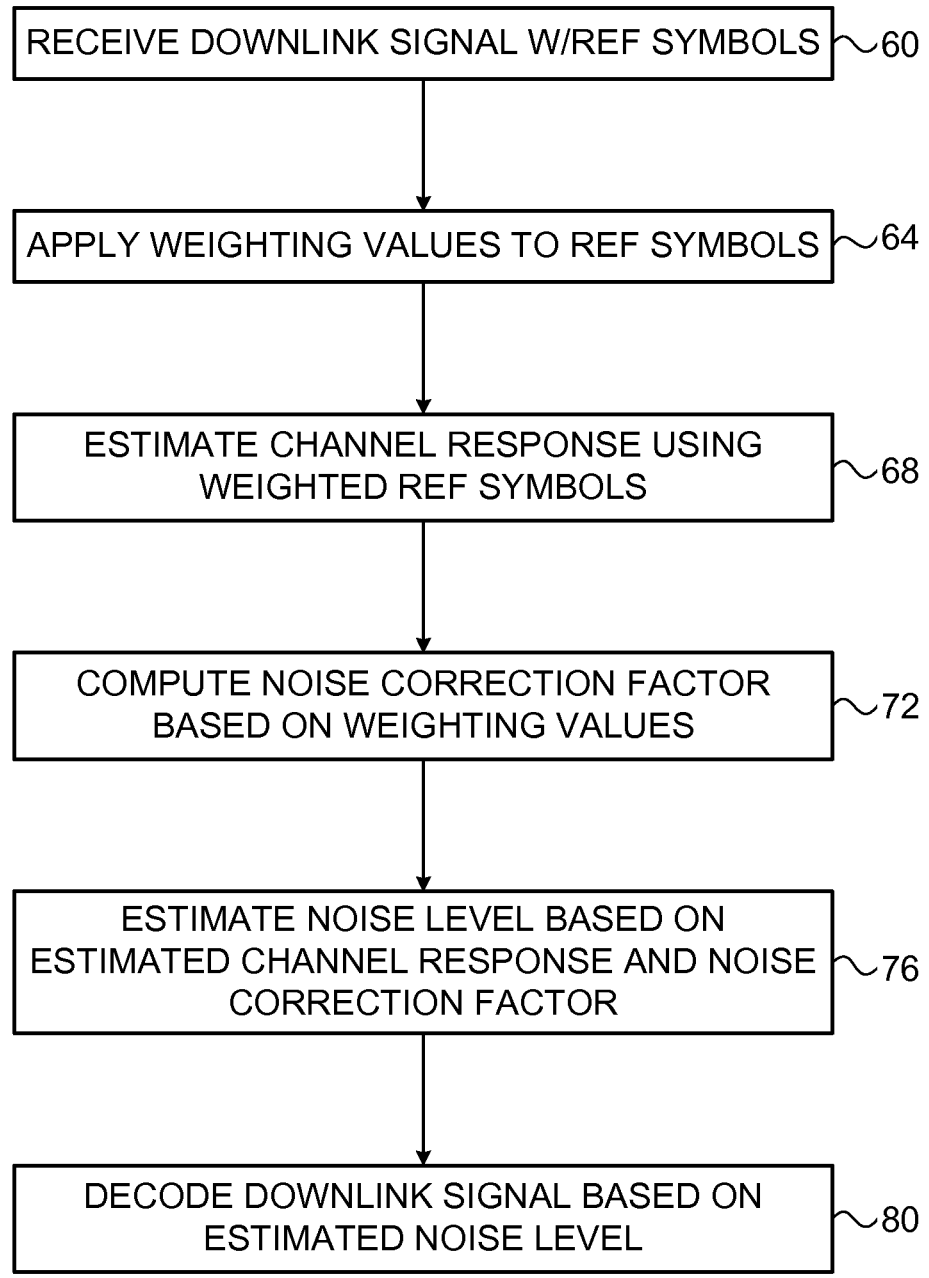
FIG. 2 is a flow chart that schematically illustrates a method for signal reception using noise estimate correction, in accordance with an embodiment that is described herein.

FIG. 2 is a flow chart that schematically illustrates a method for signal reception using noise estimate correction, in accordance with an embodiment of the present disclosure. The method begins at a reception operation 60, with RX FE 36 of UE 24 receiving a downlink signal from BTS 28. The received downlink signal comprises data-carrying symbols and reference symbols. At a weighting operation 64, channel estimation unit 40 applies weights to the received reference symbols, as explained above. At a channel estimation operation 68, channel estimation unit 40 estimates the channel response based on the weighted reference symbols.

At a noise correction operation 72, noise correction unit 56 calculates a noise correction factor based on the weights that are applied by unit 40. At a noise estimation operation 76, noise estimation unit 44 estimates the noise based on the estimated channel response and the noise correction factor. At a decoding operation 80, equalizer/demodulator 48 uses the corrected noise estimate to demodulate the data-carrying symbols of the downlink signal.

In the embodiments described above, channel estimation unit 40 assigns the weights W according to channel estimation considerations, irrespective of noise estimation or noise correction. Then, noise correction unit 56 calculates the noise correction factors B based on the given weights. In alternative embodiments, unit 40 chooses the weights while considering the noise correction factor that will be calculated by unit 56. In an example embodiment, a maximum value of the noise correction factor is predefined. Unit 40 adjusts the weights so that the resulting noise correction factor will not exceed the maximum allowed value. This technique enables the UE to trade channel estimation accuracy for noise estimation accuracy.

In some embodiments, unit 40 holds multiple sets of weights, and selects a given set for applying to a given received signal. In an example embodiment, each set of weights corresponds to a certain spectral range, and unit 40 selects the set that corresponds to the frequencies on which the signal is received. In some embodiments, unit 56 calculates a single noise correction factor for two or more of the sets of weights.

In some embodiments, noise correction unit 56 holds a list of pre-calculated or predefined values of the noise correction factor B. Unit 56 selects the appropriate noise correction factor from the list by applying a certain criterion to the channel estimation weights W. In an example embodiment, unit 56 calculates the ratio between the weight assigned to a given reference symbol and the weights assigned to the other reference symbols, and chooses a value of B from the list according to this ratio. In alternative embodiments, unit 56 can use any other suitable selection criterion.

Although the embodiments described herein mainly address downlink transmissions and noise estimation in mobile terminals, the disclosed techniques can also be used for noise estimation in uplink signals, e.g., in a BTS receiver. Although the embodiments described herein mainly address LTE systems, the methods and systems described herein can also be used in other applications, such as in WCDMA, WiMAX and LTE-A systems.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:
1. A method, comprising:
at a receiver, receiving a signal comprising reference symbols that is sent over a communication channel from a transmitter to the receiver;

estimating a response of the communication channel by applying one or more weighting values to a group of the reference symbols transmitted in respective time-frequency bins;

computing an estimate of a noise level in the received signal based on the estimated response of the communication channel and on the same group of the reference symbols over which the response of the communication channel was estimated;

computing, based on the weighting values, a noise correction factor that compensates for a deviation in the estimate of the noise level caused by estimating both the response of the communication channel and the noise level based on the same group of the reference symbols that were transmitted in the same respective time-frequency bins;

correcting the estimate of the noise level by the noise correction factor; and decoding the received signal based on the corrected estimate of the noise level.

2. The method according to claim 1, comprising calculating channel quality feedback for the communication channel based on the estimated response of the communication channel and the corrected estimate of the noise level.

3. The method according to claim 1, wherein receiving the signal comprises receiving two or more versions of the signal via two or more antennas, respectively, wherein computing the estimate of the noise level comprises calculating multiple noise covariances based on the versions of the signal, and wherein computing the noise correction factor comprises calculating multiple noise correction factors to be applied respectively to the noise covariances.

4. The method according to claim 1, wherein applying the weighting values comprises selecting the weighting values from among multiple sets of the weighting values.

5. The method according to claim 4, wherein correcting the estimate of the noise level comprises applying a single noise correction factor for at least two of the sets of the weighting values.

6. The method according to claim 1, comprising choosing one or more of the weighting values so as to improve the estimate of the noise level.

7. The method according to claim 6, wherein choosing the weighting values comprises defining a maximum value for the noise correction factor, and adjusting the weighting values such that the noise correction factor does not exceed the maximum value.

8. The method according to claim 1, wherein computing the noise correction factor comprises selecting the noise correction factor from a list of predefined noise correction factors by applying a selection criterion to the weighting values.

9. The method according to claim 1, wherein receiving the signal comprises receiving a Long Term Evolution (LTE) signal.

10. Apparatus, comprising:
a receiver front-end, which is configured to receive a signal comprising reference symbols that is sent from a transmitter to the receiver over a communication channel;
a channel estimation unit, which is configured to estimate a response of the communication channel by applying one or more weighting values to a group of the reference symbols transmitted in respective time-frequency bins;
a noise estimation unit, which is configured to compute an estimate of a noise level in the received signal based on the estimated response of the communication channel and on the same group of reference symbols over which the response of the communication channel was estimated; and
a correction unit, which is configured to compute, based on the weighting values, a noise correction factor that compensates for a deviation in the estimate of the noise level caused by estimating both the response of the communication channel and the noise level based on the same group of the reference symbols that were transmitted in the same respective time-frequency bins, and to correct the estimate of the noise level by the noise correction factor.

11. The apparatus according to claim 10, and comprising a channel quality estimation unit, which is configured to calculate channel quality feedback for the communication channel based on the estimated response of the communication channel and the corrected estimate of the noise level.

12. The apparatus according to claim 10, wherein the receiver front-end is configured to receive two or more versions of the signal via two or more antennas, respectively, wherein the noise estimation unit is configured to calculate multiple noise covariances based on the versions of the signal, and wherein the noise correction unit is configured to calculate multiple noise correction factors to be applied respectively to the noise covariances.

13. The apparatus according to claim 10, wherein the channel estimation unit is configured to select the weighting values from among multiple sets of the weighting values.

14. The apparatus according to claim 13, wherein the noise estimation unit is configured to apply a single noise correction factor for at least two of the sets of the weighting values.

15. The apparatus according to claim 10, wherein the channel estimation unit is configured to choose one or more of the weighting values so as to improve the estimate of the noise level.

16. The apparatus according to claim 15, wherein the channel estimation unit is configured to choose the weighting values by defining a maximum value for the noise correction factor, and adjusting the weighting values such that the noise correction factor does not exceed the maximum value.

17. The apparatus according to claim 10, wherein the correction unit is configured to select the noise correction factor from a list of predefined noise correction factors by applying a selection criterion to the weighting values.

18. The apparatus according to claim 10, wherein the receiver front-end is configured to receive the signal in accordance with a Long Term Evolution (LTE) specification.

19. A mobile communication terminal comprising the communication apparatus of claim 10.

20. A chipset for processing signals in a mobile communication terminal, comprising the communication apparatus of claim 10.

* * * * *